Patented Oct. 10, 1939

2,176,029

UNITED STATES PATENT OFFICE 2,176,029

CONCENTRATES FROM ANTIOXYGENIC VEGETATIVE SUBSTANCES

Sidney Musher, New York, N. Y., assignor to Musher Foundation Incorporated, New York, N. Y., a corporation of New York No Drawing. Application April 8, 1935, Serial No. 15,307

1 Claim. (Cl. 23—239)

This invention relates to the preparation of antioxidants for food products, particularly the fats and oils and hydrocarbons, such antioxidants being obtained from vegetative sources by the utilization of aqueous or solvent extracts.

In the prior art it has been proposed to use lecithin as an antioxidant for fats and oils. Such lecithin is recognized as being a definite chemical compound containing a fatty acid base with a phosphoric acid and choline radical. Lecithin is obtained commercially from the soya bean because of the fact that according to recognized authorities the soya contains probably the highest known source of lecithin of all vegetative materials, this being approximately 2¾%.

The usual method for the manufacture of lecithin requires that a benzene-alcohol solvent be used to extract the oil and the lecithin from the soya and that subsequently the lecithin is precipitated away from the soya bean oil by treatment with steam.

Necessarily therefore all of the lecithin obtained is oil soluble and this lecithin is sold on the open market. It is utilized extensively as a product which holds water and which aids emulsification. It is used extensively in the chocolate industry and it has been proposed for use in bakery products in order to cut down the total percentage of shortening used in such bakery products.

An early patent indicates the activity of lecithin as an antioxidant. Subsequent literature has shown that the antioxygenic activity of lecithin is inactivated at approximately 65° C. so that if lecithin is to be used as an antioxidant the temperature should not exceed that point.

In addition, lecithin exhibits the property of foaming when incorporated with oily or aqueous materials. If, for instance, .1% of lecithin is added to cottonseed oil, that cottonseed oil cannot satisfactorily be used for frying purposes because it exhibits a tendency to foam. This is particularly true when any partially aqueous material such as raw potatoes, raw nuts, etc., are placed into the oil for frying.

It is recognized, therefore, in the art that lecithin is an antioxidant when held at less than 65° C., such lecithin being obtained from the soya bean where large quantities of it are present, the process being to remove the lecithin from soya bean oil following the solvent extraction of the oil plus the lecithin, and such lecithin exhibiting certain qualities of foaming which render it objectionable for use with fats.

It is also recognized that lecithin so used will considerably darken the color of any white fat even to the extent that .1% of lecithin added to bleached lard will increase the color of that lard to a point where it may be rendered objectionable for use as a household package by reason of the darkening of its color.

In addition, it should be brought out that necessarily the production of lecithin as commonly employed requires that such lecithin be sold at an unusually high price. Even the unpurified forms of lecithin are sold at about 60¢ per pound whereas pure lecithin generally costs in excess of $3.00 per pound.

The present invention is accordingly concerned with the production of antioxygenic substances particularly by extraction methods and using volatile or aqueous solvents for the recovery of antioxygenic values from vegetative substances independent of the content of lecithin in such vegetative substances.

Other objects include the production of such antioxidative substances, particularly in the form of extracts, by relatively simple and inexpensive means from normally readily available substances.

In specification, Serial No. 799, filed January 7, 1935, entitled "Antioxidants" there is described and claimed the utilization of natural vegetative materials, such as the oil-containing seeds and seed cakes, including crushed sesame seed, crushed peanuts, soya flour, linseed press cake, soya bean press cake, etc., in the antioxygenic protection of non-glyceride substances, and of the cereals, such as oats, barley, hominy, etc., in the protection of various types of materials against oxidative or aging changes, by intimate admixture of the antioxidant with the material to be protected.

In specification, Serial No. 8411, filed February 26, 1935, entitled "Antioxident extracts", there is described and broadly claimed the antioxygenic volatile solvent extracts of oil-containing seeds, nuts and fruits and of cereals and grains, and the preparation of these extracts and their use as antioxidants for fats and oils and other products.

In specification, Serial No. 13,743, filed March 29, 1935, entitled "Inhibitors for packaged products", now Patent No. 2,038,752, dated April 28, 1936, there is described and claimed the use of vegetative antioxidants applied to the packaging materials utilized in the packaging of substances subject to oxidative change.

For the wide variety of products for which antioxygenic materials are desirable certain properties should be exhibited. First of all, such antioxidant concentrates must be relatively free of color and taste so as not to change the color or taste of the products with which they are used or with which they are placed in contact.

Secondly, they should not change the physical properties of the products with which they are used so that, for instance, when added to lard the concentrates should not cause excessive bubbling of the lard under heat but should permit the lard or other shortening to be used as a frying fat without change of its essential properties.

Thirdly, such concentrate should be made available as cheaply as possible and in the kind of way that it would be readily acceptable for general use. Lard is sold on a relatively small margin of profit, it being looked upon as a by-product in most instances. Therefore the addition of any material, the cost of which would be excessive, would not find a practical outlet.

In the fourth place, such antioxidant should remain effective at relatively high temperatures so that it could be used for a variety of fats and so that its activity would be carried through into the finished product.

It is essentially brought out here that the commonly available lecithins do not meet this purpose from any of these standpoints. Such lecithins when used in small percentage will increase the color, will cause foaming, will require a substantially higher cost and will not remain effective at substantially high temperatures.

I have found that it is possible by reason of certain extracts to obtain antioxidant concentrates of these oil bearing seeds and cereals and non-oil bearing vegetative matters, such products complying in the main with the requirements set forth above.

There are any number of ways in which the process may be carried out, it being understood that such examples as are given are by way of illustration and explanation only, and not by way of limitation, since various changes therein may be made by those skilled in the art without departing from the scope and spirit of the present invention.

For instance, if soya flour is submitted to an aqueous extraction, after the water has distilled off from that extract a brown colored, sweet in taste, and partly crystalline product will be obtained which when used to the extent of .25% in bleached lard will show the following activity:

| | Hours |
|---|---|
| Control bleached lard | 1½ |
| Bleached lard plus .25% aqueous extract of soya flour | 6 |

These tests and similar tests referred to below are based on accelerated aging tests obtained in apparatus of standard type to determine the aging characteristics of these materials under accelerated aging conditions. Thus in the example given immediately above, the bleached lard which of itself under such conditions exhibited an undesired development of rancidity in 1½ hours, when incorporated with but .25% aqueous extract of soya flour had its life extended four times.

In this case the aqueous extract was ground into as pulverized a condition as possible and was dispersed through the body of the fat. If under the same conditions the extract is allowed to be infused in the lard for 15 minutes at 150° F. and subsequently filtered off, the following results are obtainable:

| | Hours |
|---|---|
| Control bleached lard | 1½ |
| Bleached lard plus .25% aqueous extract of soya flour held at 150° F. for 15 minutes and filtered off | 2¾ |

It is found that this aqueous extract of soya flour removes only approximately 15% of the total soya bean product. This low percentage is presumably due to the fact that soya contains a large amount of protein and the water solubles, therefore, are necessarily low.

Since this keeping quality test is carried out at 208° F. it is assumed that lecithin is not responsible for the activity because lecithin is recognized as being inactivated at 65° C. Actually .25% of pure lecithin as well as .25% of crude lecithin as normally prepared and sold commercially was added to lard and gave appreciably no protection.

In addition it is known that lecithin is entirely fat soluble. But it is shown that apparently a portion of the non-fat soluble portion is responsible for some of the antioxygenic activity otherwise whether the extract is used in a filtered or in an unfiltered condition should make no difference in the antioxygenic properties of that extract.

The aqueous extract of any of these vegetative materials may well remove a portion of the antioxygenic activity of these flours. It is not even necessary to work with the untreated soya flour since soya press cake will give equally effective results. Similarly such equivalent results could be obtained by utilizing corn germ press cake, linseed press cake, in all of which products the fat content is under 10% and a substantial part of the fat has been removed by the usual processes.

Separate and apart from the aqueous extracts of these materials, it has been found that the direct extraction of the meals themselves with the organic solvents will remove substantially all the antioxidants of these meals. In taking such extractions it is noteworthy that the materials obtained are generally sweet in taste and some are oily in character while others are crystalline. Some are oil soluble. Others appears to be principally water soluble.

In taking the extracts direct from the meals themselves, approach is made directly to the material which contains the antioxidant. Heretofore it was thought that such antioxidants as a crude oil normally possesses are present in the oil itself. This is not the case since the majority of the antioxidants are tied in with the meal structures and are presumably not related either to the presence nor the quantity of oil in such materials.

For instance, soya flour contains approximately 21% of soya bean oil and approximately 2¾% of total phospholipins including lecithin. Soya flour is a most effective antioxidant when used with lard but exhibits markedly less antioxygenic activity when used with vegetable oils including soya bean oil. On the other hand, oat flour although normally containing 4¼% oat oil and only ¼% of total phosphatides is markedly effective as an antioxidant in vegetable oils, including soya bean oil, but comparatively less effective for lard. There is no logical explanation for this phenomenon but it must be understood that the activity of the oat flour is not related to the presence of the oat oil nor to the total amount of phospholipins present and the same can be said of the soya flour.

In addition, soya lecithin exhibits substantially no activity as an antioxidant at 65° C. even when used to the extent of .5% yet 5% of the soya flour itself will extend the life of lard by approximately 10 times. It should be borne in mind in this connection that 5% of soya flour added to lard is the equivalent of only .14% of total phospholipins, of which only a portion is pure lecithin.

The methanol or ethyl alcoholic extract of full fat soya flour yields approximately 10% of total extract. This product is comparatively light in color and for the most part crystalline and has a slightly sweet taste. Undoubtedly some of the phospholipins are present in that extract and such phospholipins may be tied up with a sugar radical. It is noteworthy, therefore, that when this extract is used to the extent of .5% in bleached lard it exhibits the following activity:

|  | Hours |
|---|---|
| Control bleached lard | 1½ |
| Bleached lard plus .5% methanol or ethyl alcoholic extract of full fat soya flour | 11 |

This test is carried out at 208° F. The color of the lard so treated is slightly darkened but not sufficiently as to cause it to be objectionable for commercial use. Note must be taken also of the fact that the presence of this .5% in lard does not cause any material change in the physical qualities of that lard so that relatively little or no bubbling actually takes place.

The full .5% of this extract which is only partially soluble in lard may remain in that lard even for commercial sale since the presence of the insoluble material is not sufficient to damage the value of the lard.

In the event that the extract is infused in lard at 150° F. for 15 minutes and the insoluble material subsequently filtered off, the following results are obtainable:

|  | Hours |
|---|---|
| Control bleached lard | 1½ |
| Bleached lard plus .5% methanol or ethyl alcoholic extract of full fat soya flour infused at 150° F. for 15 minutes and filtered off | 4½ |

Note must be taken of the fact that filtering out the solids material lessens its antioxygenic properties. It must, therefore, be concluded that the insoluble materials are responsible for some of the antioxygenic activity. This conclusion is directly related to the infusion of the soya flour itself at 150° F. for 15 minutes and subsequently filtered out as it has been shown that when the flour remains in suspension in the lard material, greater activity is given than when the flour is merely infused in the lard and the insoluble portion of that flour subsequently filtered off.

It is likely that this phenomenon is related to the presence of the insoluble sugars but it may not necessarily be concluded that that is the case but only that the phenomenon itself occurred wherein the insoluble portion of the extract of soya flour contains a substantial portion of the active antioxygenic ingredient of soya flour and its effectiveness is only to be noted when that insoluble portion is allowed to remain diffused through the body of the fat.

Relatively the same results are obtained when soya press cake is used, such soya press cake containing aproximately 6% of soya bean oil. The alcoholic extract removes from the meals themselves a substantial amount of this oil insoluble material together with the oil soluble material which exhibits the antioxygenic properties described.

In place of using these alcohols, other solvents have been used with equivalent results. Even acetone in which lecithin is recognized as being insoluble may be used as an extract to remove the antioxygenic materials from these flours.

Acetone is a likely solvent to be employed when it is particularly desired to free the concentrate of lecithin and may be employed for that purpose.

In all this work, it is desirable that only one extract be taken although it is not intended that we limit ourselves to the taking of but one extract. Merely from the standpoint of economy of operation and of producing a product which will have the greatest activity for the least cost is it desirable to take a single extract direct from the meal, the left-over meals going directly into the channels of edible flour, whether for human beings or for animals, and the extract being utilized directly for its antioxygenic properties. Subsequent extracts may, however, be taken for purposes of identification of the active ingredient or for purposes of further concentration of the antioxidant but it is not deemed advisable to do so.

The soya extract so obtained is to a considerable extent water soluble and therefore may be utilized for all aqueous products, for the making of a sizing for parchment paper, or for addition to the continuous aqueous phase of an emulsion in order to give protection to the discontinuous oily phase of such emulsion.

In the same way the organic solvent extracts of the other oil bearing seeds may be obtained with relatively the same results. Such materials as crushed peanuts, peanut press cake, crushed sesame seed, sesame seed press cake, crushed castor beans, castor pumace, etc. may well be utilized.

In the field of non-oil bearing vegetative materials such as the cereals, the alcoholic extracts are obtained in a little different form. Such extracts are of a more oily nature and are more fat soluble. They, however, as well do not exhibit any marked tendency to foam except with certain special products and even these do not produce nearly as great a foam as when a crude or pure lecithin is employed.

It is desirable in many of these cereals to work with the decorticated product. In the case of oats, for instance, whole pulverized oats will upon alcoholic extraction yield a partly oil and partly crystalline product but considerably darker in color and more bitter in taste than the same extract taken from the decorticated oat flour, which extract is more oily in character and pleasing in taste and much lighter in color.

The methanol or ethyl alcoholic extract of decorticated oat flour, for instance, when used to the extent of .2% in lard is probably 60% soluble in the lard and without changing materially either the color or the flavor of that lard shows the following antioxygenic activity:

|  | Hours |
|---|---|
| Control bleached lard | 1½ |
| Bleached lard plus .2% alcoholic extract of decorticated oat flour | 5 |

Less of the total extract is obtained in the case of oat flour than is obtained in the case of soya flour but the activity of that extract is comparatively as great. The oat extract is, of course, particularly desirable for use with the vegetable oils since its effectiveness is greater in the case of vegetable oils than in the case of lard.

In the same way an alcoholic extract of hominy flour or of barley flour yields relatively the same type of material with relatively the same activity. Such alcoholic extracts remain effective as antioxidants at temperatures in excess of 208° F., the oat extract exhibiting more tendency to foam than the hominy extract but neither in anywhere near the same classification as the property of the lecithin compound to foam. In the case of decorticated oat flour, from 4% to 6% of total extractive material is obtained and it is recalled that in this decorticated oat flour approximately ¼% of total phospholipins should be present.

Similar concentrates are obtained when using such other organic solvents as benzene, gasoline, acetone, etc. It is noteworthy that these cereals are chosen as powerful antioxidants separate and apart from the presence in them of the relatively small percentages of glycerides or of phospholipins since it should never be considered from a commercial point of view to extract from the cereals either their fat content or their lecithin content. A product such as the corn germ or the cottonseed or peanut is chosen essentially for its glyceride oil content whereas the soya product is chosen for both its soya bean oil content and for its lecithin content. It is even noteworthy that the press cakes from the oil bearing seeds are never used for their lecithin content since it is well understood that most of the lecithin is removed by the expression of the oil and therefore the press cakes contain relatively little of the lecithin.

Such solvent extracts as are obtained from the oil bearing seeds and the cereals and particularly as obtained from the oil bearing seeds will contain in excess of 25% total saccharous materials. It is not certain as to how these sugars are tied in with these extracts, but either the sugars or the other insoluble materials are responsible for the additional antioxygenic activity of these extracts when allowed to remain diffused in the fats and when not filtered off from the fats.

The cereals which on the whole contain less than .5% of total phospholipins, as distinct from the oil bearing seeds which contain in excess of 1.5% total phospholipins may not exhibit the tendency to deposit sugar upon taking such solvent extracts. Nevertheless such extracts are materially effective antioxidants when used either in their filtered or unfiltered condition. The use of such cereals containing less than 7% total fat and less than .5% of total phospholipins for their antioxygenic properties by reason of utilizing their solvent extracts is wholly novel.

It is understood that such extracts as have been described in part may be added to the entire field of vegetable and animal fats and oils or to fat and oil containing products or by reason of my copending applications may be utilized in any of the processes described therein or may be utilized as antioxidants for the hydrocarbon oils, citrus fruit juices, egg yolks, whether by infusion into the product or sprayed upon the surface of the product or incorporated into the packaging material used to package that product.

It is understood that the examples as given herein and that such types of solvents as are above mentioned and that such percentages as have been specifically referred to are all given by way of illustration and explanation only, and not by way of limitation, since various changes therein may be made by those skilled in the art without departing from the scope and spirit of the present invention.

Having thus set forth my invention, I claim:

A food composition subject to oxidation intimately incorporated with an antioxygenic alcoholic extract of cereal flour, such cereal flour before extraction containing less than .5% total phospholipins.

SIDNEY MUSHER.